United States Patent [19]
Burkett et al.

[11] Patent Number: 5,276,594
[45] Date of Patent: Jan. 4, 1994

[54] ADD-ON VEHICLE SAFETY LIGHT MONITOR

[76] Inventors: Mark E. Burkett, 5766 Guatemala Way, Buena Park, Calif. 90620; Eldon G. Burkett, 18771 Laurel Way, Cottonwood, Calif. 96022

[21] Appl. No.: 949,407

[22] Filed: Sep. 22, 1992

[51] Int. Cl.[5] .................................. B60Q 1/26
[52] U.S. Cl. ............................ 362/83.3; 362/32; 362/80; 116/DIG. 5
[58] Field of Search ............. 362/321, 61, 80, 83.3; 340/815.31, 458, 475, 479; 116/DIG.

[56] References Cited

U.S. PATENT DOCUMENTS

| | | | |
|---|---|---|---|
| 1,462,065 | 7/1923 | Lee | 362/32 X |
| 1,538,177 | 5/1925 | Deery | 362/32 |
| 3,569,933 | 3/1971 | Longenecker et al. | 362/80 X |
| 3,761,706 | 9/1973 | Frey | 362/32 |
| 4,642,737 | 2/1987 | Meyers, Jr. | 362/32 X |
| 5,104,608 | 4/1992 | Pickering | 362/32 |

FOREIGN PATENT DOCUMENTS 2037969  7/1980  United Kingdom ......... 116/DIG. 5

Primary Examiner—Stephen F. Husar
Attorney, Agent, or Firm—Roy A. Ekstrand

[57] ABSTRACT

An add-on vehicle light monitor includes a light pipe formed of a light coupling transparent material and having an input end and an output end. The light pipe is configured to be supported upon the vehicle body at a position in which the input end is approximate to the to-be-monitored light source and the output end is viewable by the vehicle driver or operator. In one embodiment, an aperture is formed within the vehicle taillight lens to permit the input end to be inserted into the vehicle light assembly. In an alternate embodiment, the input end is fabricated so as to be flush mountable to the light assembly lens without the need for forming an aperture therein.

10 Claims, 2 Drawing Sheets

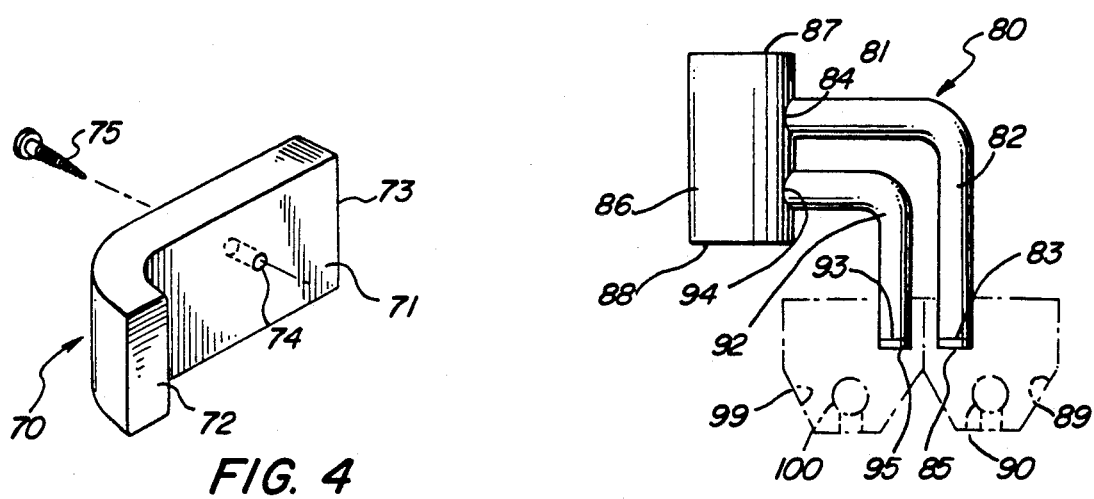
FIG. 4
FIG. 5
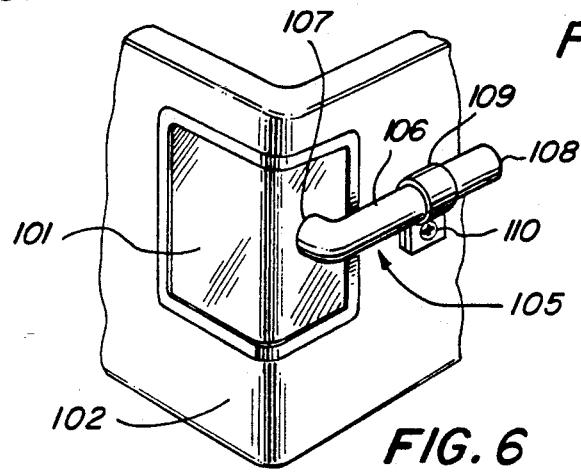
FIG. 6
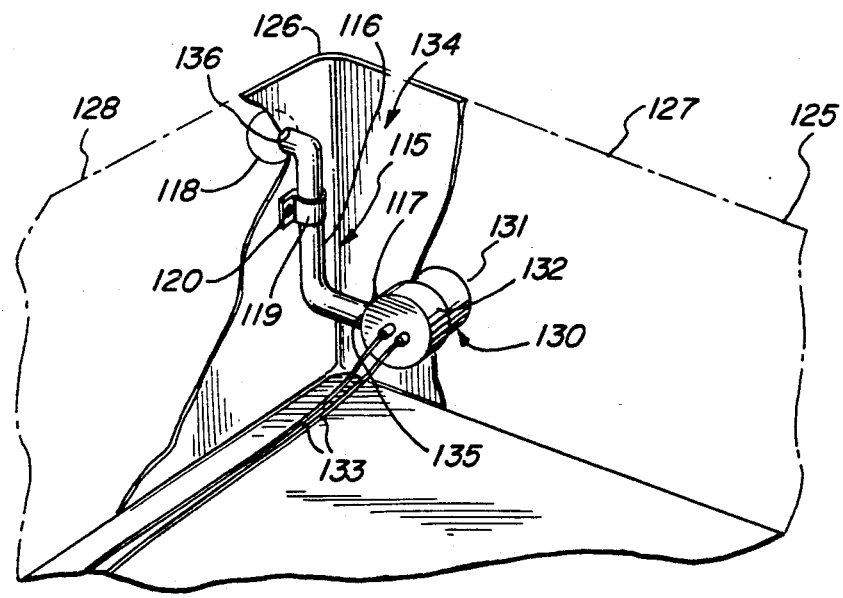
FIG. 7

ADD-ON VEHICLE SAFETY LIGHT MONITOR

FIELD OF THE INVENTION

This invention relates generally to motor vehicle lighting and warning systems and particularly to those systems provided to monitor the condition of safety lights upon the vehicle.

BACKGROUND OF THE INVENTION

To provide safe operation of motor vehicles and trailers, fabricators generally provide a plurality of lights and signalling devices to aid the driver and improve the vehicle visibility. Such lighting systems typically include a plurality of forwardly directed headlights which aid the driver in viewing the operating environment in dark situations such as night driving. In addition, vehicles and trailers as well as other similar devices operated upon roadways include a plurality of rearwardly directed brake lights or taillights together with a plurality of frontal and rear signal lights commonly referred to as "turn signal lights".

Taillight or brake lights assemblies are primarily operative to warn other vehicle operators of anticipated activities being undertaken by the driver as well as increasing the general visibility of the vehicle from the rear. Such taillights are generally red in color and include means for operation at different illumination conditions in response to the presence or absence of brake actuation by the vehicle driver. Turn signal lights are generally provided at both the front and rear of the vehicle and are often integrated into the brake light assemblies of the vehicle. Such turn signal lights have in recent years been distinguishable from taillights or brake lights by the use of an amber or clear lens system. Signal lights are operated by the vehicle operator in anticipation of a turn in either direction and thus provide warning for operators of other vehicles.

The safe operation of the motor vehicle requires that the operator periodically inspect the vehicle for operative lights and so on. However, between normal inspections, the operator remains generally unaware of various types of malfunctions which may occur within the turn signal indicating lights or taillight and brake light systems. Faced with the obvious safety problems created by inoperative turn signal lights and taillight and brake light systems, of which the driver is generally unaware, practitioners in the art have endeavored to provide and develop various indicator check systems directed toward providing reliable indication to the vehicle operator of lighting system malfunctions.

For example, U.S. Pat. No. 3,569,933 issued to Longenecker, et al. sets forth a SIGNALLING SYSTEM WITH INDICATING MEANS for use on vehicles which indicates the condition of the lighting system thereof. The system includes fiber optic coupling means extending between the vehicle light system and indicating means positioned within the vehicle for observation by an operator thereof.

U.S. Pat. No. 3,761,706 issued to Frey sets forth an INDICATING SYSTEM FOR INCANDESCENT LAMPS FOR VEHICLES utilizing a fiber optical light conductor set in which a light conductor is arranged on each vehicle side and has one end thereof adjoining a light source. The remaining ends of each light conductor are supported at the rear window of the vehicle to be observable by the vehicle operator.

U.S. Pat. No. 4,826,273 issued to Tinder, et al. sets forth a REMOTE AUTOMOTIVE LIGHT DIVERTING SYSTEM in which a light pipe including a light diverting section in which light following through the light pipe in a longitudinal direction is diverted at least generally radially out from the light pipe is utilized. The light pipe collects rays emanating from the vehicle light system.

U.S. Pat. No. 4,996,442 issued to Mark sets forth a COMBINATION HOODSCOOP AND TACHOMETER includes a rear facing surface visible to the driver which is equipped with indicating instruments such as a tachometer, a pair of directional signal indicators, a pair of parking lamps indicators and a pair of high beam head lamp indicators. The hoodscoop may include a removable back plate to accommodate a decorative panel as an alternative arrangement.

While the foregoing described prior art devices have, in some sense improved the safety of motor vehicles through providing some monitoring capability for the turn signal and taillight and brake light systems, there are often found to be expensive and complex. In addition, such systems are generally adapted to be installed within the vehicle or trailer during the fabrication process. As a result, there remains a great number of motor vehicles which will continue to operate upon the world's roadways for many years which lack the provision of such safety light monitoring apparatus. There arises, therefore, a continuing need for an improved low cost system for monitoring the operation of motor vehicle turn signal and taillight or brake light systems. In particular, there remains a need for economical after market or add-on apparatus which may fulfill such safety monitoring and which may be readily utilized on existing vehicles and trailers to improve the overall safety of the world's highways and roadways.

SUMMARY OF THE INVENTION

Accordingly, it is a general object of the present invention to provide an improved vehicle safety light monitor. It is a more particular object of the present invention to provide an improved vehicle safety light monitor which is economical and low cost and which may be readily installed upon existing vehicles as an add-on or after market device.

In accordance with the present invention, there is provided for use in combination with a vehicle having a body, a driver's seat and a signal light, an add-on light monitor comprises: a light pipe having an input end, an output end and a light coupling body therebetween; and attachment means for securing the light pipe to the body such that the input end is optically coupled to the signal light and the output end is viewable from the driver's seat, the light pipe being installable upon the body following complete fabrication and assembly of the vehicle.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 4 sets forth a perspective view of a still further alternate embodiment of the present invention light monitor;

FIG. 5 sets forth a still further alternate embodiment of the present invention light monitor;

FIG. 6 sets forth a partially sectioned perspective view of a still further alternate embodiment of the present invention; and FIG. 7 sets forth a partially sectioned perspective view of a still further alternate embodiment of the present invention light monitor system.

DESCRIPTION OF THE PREFERRED EMBODIMENTS

Figure 1:
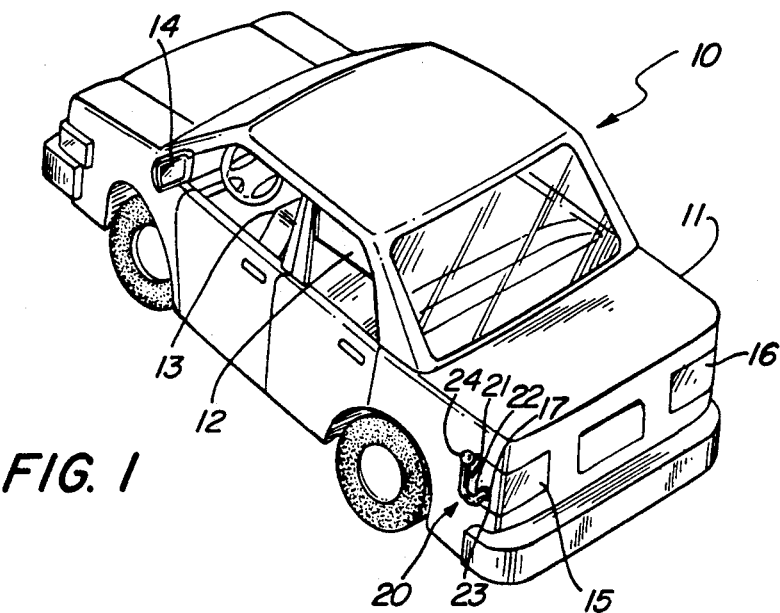
FIG. 1 sets forth a rear perspective view of a typical motor vehicle having the present invention light monitor secured thereto.

FIG. 1 sets forth a rear perspective view of a typical motor vehicle generally referenced by numeral 10. In accordance with conventional fabrication techniques, vehicle 10 includes a body 11 defining an interior driver and passenger compartment 12 which in turn includes a driver's seat 13. In further accordance with conventional fabrication techniques, vehicle 10 includes a side view mirror 14 which is positioned with respect to driver's seat 13 to permit the driver or vehicle operator seated therein to view a portion of the visual area behind and alongside of vehicle 10. While not seen in FIG. 1, vehicle 10 may further include an additional side view mirror on the opposite side of mirror 14 to further increase the rearward and sideward field of the driver seated within driver seat 13. In further accordance with conventional fabrication techniques, vehicle 10 includes a pair of taillight and brake light assemblies 15 and 16.

In accordance with the present invention, a light monitor generally referenced by numeral 20 is coupled to taillight 15 to provide an indication of the operation of taillight 15 for the vehicle driver. More specifically, an aperture 17 has been formed in taillight 15 which receives a seal gasket 23. A light pipe 21 having a plurality of curved sections includes an inwardly extending end portion 22 which passes through seal gasket 23 and extends into the interior of taillight 15. Light pipe 21 further includes a generally spherical output end 24. In its preferred form, light pipe 21 is fabricated of a clear light coupling material such as lucite or the like having the capability of coupling light energy received by end 22 to illuminate output end 24.

Thus, in accordance with the preferred operation of the present invention light monitor, the production of light energy by taillight 15 such as during braking activities or the like produces light energy which is received at end 22 of light pipe 21 and coupled thereby to output end 24. Output end 24 acts as a radiator or output lens from which the light energy received by end portion 22 is radiated outwardly. Thus, the driver of motor vehicle 10 may readily observe the condition and operation of taillight 15 by viewing the output condition of end portion 24 of light pipe 21. This observation may alternatively be undertaken using a direct rearward observation by the driver or preferably through the use of the reflected image within side view mirror 14.

While not seen in FIG. 1, it will be apparent to those skilled in the art that a light monitor similar to light monitor 20 may also be secured to taillight 16 and observed using the opposite side mirror (not shown) in the manner described above to observe the light output condition of taillight 16.

In accordance with an important aspect of the present invention, light monitor 20 is fabricated to provide an after market or add-on capability which permits its application and use with a motor vehicle having been previously manufactured without the benefit of the above-described fiber optic light coupling devices. In this manner, the present invention light monitor encourages the implementation of a safe and reliable light monitoring system helping to ensure overall safety for vehicle operators. It will be apparent to those skilled in the art that in accordance with the descriptions and figures set forth below together with those set forth in conjunction of FIG. 1 that the present invention light monitor may be fabricated in a variety of shapes and configurations to suit the virtual endless variety of vehicles which benefit from its application. The important aspect is the provision of a convenient, safe and inexpensive device which provides and encourages the monitoring and proper maintenance of the signalling and warning lights of motor vehicles by the vehicle operators themselves.

Figure 2:
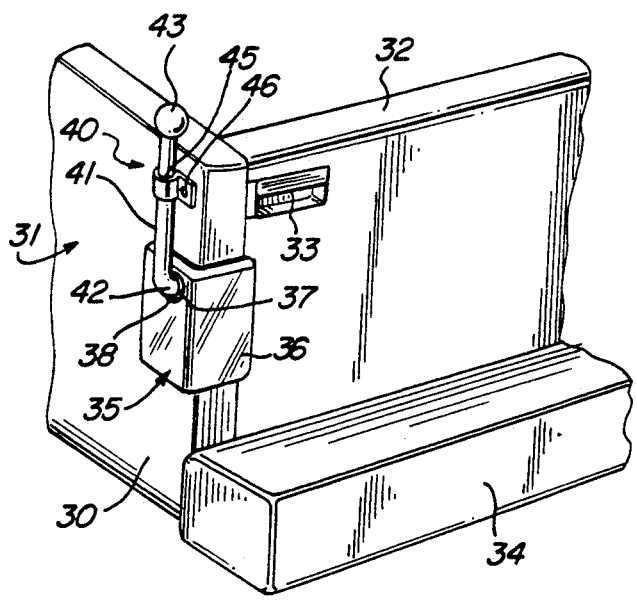
FIG. 2 sets forth a partial perspective view of an alternate embodiment of the present invention light monitor.

FIG. 2 sets forth a partially sectioned rear perspective view of a typical pick-up truck upon which an alternative embodiment of the present invention has been installed. A pick-up truck vehicle generally referenced by numeral 30 includes a rectangular truck bed 31 having a movable tailgate 32 and a bumper 34 fabricated in accordance with conventional fabrication techniques. A latch 33 secures tailgate 32 to truck bed 31 and maintains tailgate 32 in the raised position shown in FIG. 2. Truck 30 further includes a conventional taillight and brake light assembly 35 having an outer lens 36. In accordance with conventional fabrication techniques better seen in FIG. 3, taillight and brake light assembly 35 includes one or more internally supported incandescent bulbs and reflector structures which provide for illumination of lens 36 in accordance with vehicle operation. In its anticipated fabrication, lens 36 forms a red colored lens such that the light emanating therefrom is tinted with a red warning color.

In accordance with the present invention, an aperture 37 has been formed in lens 36 through conventional fabrication techniques such as drilling or the like. A gasket 38 is received within aperture 37 in a sealing engagement. In further accordance with the present invention, a light monitor 40 includes a generally L-shaped light pipe 41 having an input end 42 passing through gasket 38 and aperture 37 and into the interior of taillight and brake light assembly 35. Light pipe 41 further includes a generally spherical output end 43 and an attachment clamp 45. Clamp 45 is secured to truck bed 31 by a conventional fastener 46 and captivates the vertical portion of light pipe 41 against the exterior surface of truck bed 31. In its preferred form, light pipe 41 is sufficient in length to extend upwardly beyond the top edge of truck bed 31 and thus be readily visible to the driver.

In the anticipated operation of light monitor 40, light pipe 41 is fabricated of a light coupling material such as clear lucite or the like and as a result the illumination of taillight and brake light assembly lens 36 by the incandescent sources within assembly 35 couples a portion of the light energy to input end 42 which is coupled by light pipe 41 to output end 43. The coupled energy emanates outwardly from output end 43 and thus is clearly visible to the driver. This permits the driver to confirm that the light producing mechanism coupled to and supported within taillight and brake light assembly 35 is properly working. In its preferred form and as is set forth below in FIG. 3, input end 42 supports a colored filter (such as filter 52 in FIG. 3) which provides a corresponding tinted wavelength of light output from output end 43. Thus, if for example, the input filter at input 42 of light pipe 41 is red or red selective, the light energy passing through input end 42 and coupled by light pipe 41 to output end 43 will be correspondingly red in wavelength and thus easily recognizable by the driver. This aspect is particularly helpful in situations in which ambient light conditions such as other vehicle headlights render recognition and distinguishing of light energy from taillight and brake light assembly 35 otherwise difficult to recognize. It should be further noted that light monitor 40 may be secured to truck 30 through the simple application of forming aperture 37, inserting gasket 38 and utilizing clamp 45 and fastener 46 to secure light pipe 41 in place. Thus, in accordance with the present invention, light monitor 40 is readily usable in vehicles not previously intended during their fabrication to have provided the light monitoring capability.

Figure 3:
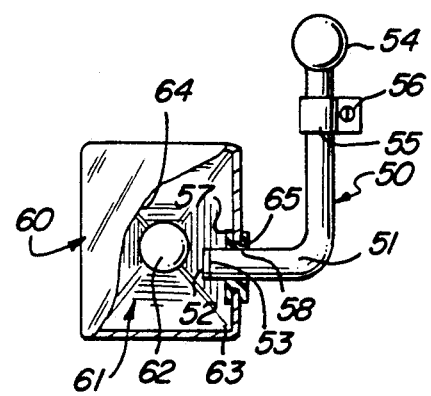
FIG. 3 sets forth a section view of the present invention light monitor secured to a typical taillight assembly.

FIG. 3 sets forth a partially sectioned typical light monitor and typical taillight and brake light assembly of the type described above in FIGS. 1 and 2. A taillight and brake light assembly 60 is constructed in accordance with conventional fabrication techniques and thus includes a generally hollow housing 61 supporting a reflector 63 and an incandescent bulb 62. A taillight lens 64 typically formed of a clear red plastic material or the like extends across the outer area of housing 61 and covers reflector 63 enclosing bulb 62.

In accordance with the present invention, an aperture 65 is formed within lens 64 and receives and supports a sealing gasket 57. Gasket 57 further defines an aperture 58 therethrough.

A light monitor generally referenced by numeral 50 and constructed in accordance with the present invention includes a generally L-shaped light pipe 51 preferably formed of a clear transparent light coupling material such as lucite or the like. Light pipe 51 defines an input end 53 and an output end 54. As described above, output end 54 is formed in a generally spherical shape for convenience. However, it will be apparent to those skilled in the art that in accordance with the present invention, output end 54 may be formed in an alternate manner or shape with the necessary aspect being the capability to radiate or output the light energy coupled from input end 53. Input end 53 extends through aperture 58 of gasket 57 in a sealing engagement and supports a filter 52. Filter 52 is selected to provide the desired color or hue of light energy radiated outwardly from output end 54. While in its normally anticipated use, filter 52 may utilize a red color filter, in different situations and circumstances of operation, it may be desirable to utilize some other color of filter for filter 52 in order to better distinguish and identify the source of light emanating outwardly from output end 54.

In the normal operation of taillight and brake light assembly 60, bulb 62 is energized to produce light energy under certain operating conditions such as the application of the vehicle brakes. This light energy is directed by reflector 63 through lens 64 to produce the desired warning characteristic. In accordance with the present invention, a portion of the light energy produced by bulb 62 passes through filter 52 and is received within end 53 of light pipe 51 The light coupling characteristic of light pipe 51 couples this input light energy to output end 54 at which point it radiates outwardly to indicate the energizing of bulb 62. Thus, the occurrence of output light at end 54 of light pipe 51 results solely from energizing of bulb 62 and thus provides a reliable indication of the operation of bulb 62 as well as all supporting systems used to energize the bulb. Clamp 55 and fastener 56 secures light pipe 51 at the desired position on the host vehicle (not shown) and completes the installation of the present invention light monitor.

Thus, in accordance with the present invention, light pipe 51 is fabricated to provide an add-on or after market light monitor unit. In addition, the application of filters such as filter 52 provides selectivity in connection with the particular energized lamp to which light pipe 51 in responding.

FIG. 4 sets forth a further alternate embodiment of the present invention light monitor generally referenced by numeral 70. Light monitor 70 includes a generally rectangular cross sectioned light pipe 71 preferably formed of a clear transparent light coupling material such as lucite or the like. Light pipe 71 defines a rectangular shaped input end 72 and a rectangularly shaped output end 73. Light pipe 71 further defines an aperture 74 extending therethrough which receives a conventional fastener 75 to provide convenient attachment for light pipe 71 to a host vehicle (not shown).

Light monitor 80 is fabricated to provide an alternate shape and configuration to that set forth above in FIGS. 1 through 3. The rectangular shape of light pipe 71 provides a substantial light coupling capability while maintaining a relatively thin profile to accommodate vehicles and installation situations in which the more obtrusive configuration provided by circular cross section light pipe configurations is inappropriate or less desirable. In addition, light pipe 71 may be utilized without forming an aperture in the taillight lens in the host vehicle and is preferably installed having input end 72 in contact with the outer surface of the host vehicle taillight lens. When so configured, sufficient light energy is coupled to input end 72 to provide a light energy output at output end 73 which indicates the operation of the incandescent bulb within the host taillight assembly.

FIG. 5 sets forth a still further alternate embodiment of the present invention light monitor generally referenced by numeral 80. Light monitor 80 is utilized in combination with a vehicle light assembly having a pair of reflectors 88 and 89 which are independently energized by a pair of incandescent bulbs 90 and 100 respectively. Reflectors 89 and 99 and bulbs 90 and 100 are shown in dashed line representation for purposes of illustration and are intended to represent a variety of applicable vehicle taillight and brake light configurations in which isolated separately energizable bulb combinations are utilized.

Light monitor 80 includes a light pipe 81 having a pair of light couplers 82 and 92 having output ends 84 and 94 respectively coupled to a common collector 86. Collector 86 defines an output end 87 and an output end 88. It may be desirable in certain applications to cover either of output end 87 or 88 to further concentrate the light output energy from the remaining output portion. Coupler 82 further includes an input end 83 supporting a filter 85. Correspondingly, coupler 92 defines an input end 93 supporting a filter 95. Input end 83 and 93 of couplers 82 and 92 respectively ar supported to provide optical coupling to bulbs 90 and 100 respectively.

In operation, filters 85 and 95 are configured to couple different light wavelengths or hues. For example, filter 85 may form a red coupling or red transmissive filter while filter 95 forms a yellow or amber light transmissive characteristic. In such case, the energizing of bulb 90 produces light energy which when filtered by red filter 85 is coupled through coupler 82 and exhibits a red hue while light energy produced by bulb 100 is coupled to coupler 92 by yellow filter 95 and thus exhibits a yellow hue. Within collector 86, the light outputs of either or both of couplers 82 and 92 are coupled to output ends 87 and 88. In the anticipated use of light monitor 80, the different color characteristics of filters 85 and 95 and the resulting differences of color imparted to the light energies from bulbs 90 and 100 permits the operator to view output 87 or 88 and simply by observing the hue of light energy emanating therefrom determine which of bulbs 90 and 100 are operative. In the example selected, if bulb 90 is energized, the light output from collector 86 is red in color while the energizing of bulb 100 produces a yellow or amber color output. In the event both are energized, then light energy of combined hue red and yellow is observed. This permits the vehicle operator to determine immediately which bulb or bulbs are operating.

FIG. 6 sets forth a still further alternate embodiment of the present invention light monitor generally referenced by numeral 105. A vehicle body 102 supports a taillight lens 101. Light monitor 105 includes a light pipe 106 having an input end 107 and an output end 108. Input end 107 is generally flat and is supported in contact with lens 101. Unlike the embodiments set forth above in FIGS. 1 through 3, no aperture is formed in lens 101. Thus, light pipe 106 is supported upon vehicle body 102 such that output end 108 faces forwardly toward the driver while input end 107 is maintained in contact with lens 101. As a result, clamp 109 and fastener 110 are utilized to secure light pipe 106 in the position shown. Optical coupling of light energy produced within the interior of lens 101 is coupled to input end 107 and emanates outwardly from output end 108 to provide the observable indication desired by the vehicle operator.

FIG. 7 sets forth a partially sectioned perspective view of a still further alternate embodiment of the present invention light monitor generally referenced by numeral 115 and configured to be utilized in combination with a vehicle trailer generally referenced by numeral 125. Trailer 125 defines a rear corner 126 formed by the intersection of a rear surface 127 and a side surface 128. A taillight 130 constructed in accordance with conventional fabrication techniques is supported within interior 134 of trailer 125 and includes a rearwardly extending lens 131 and a taillight housing 132. A plurality of connecting wires 133 are coupled to taillight 130 in accordance with conventional fabrication techniques. Housing 132 defines an aperture 135 and is accessible within interior 134 of trailer 125. Side surface 128 defines an aperture 136 extending therethrough.

In accordance with the present invention, a light monitor 115 includes a light pipe 116 having an input end 117 received within aperture 135 of housing 132 and an output end 118 extending through aperture 136 and terminating in a spherical output member. Thus, light pipe 116 is supported within interior 134 of trailer 125 and provides optical coupling between housing 132 of taillight 130 and a spherical output end 118 extending outwardly from the exterior of side surface 128. A clamp 119 and fastener 120 secure light pipe 116 within interior 134 of vehicle trailer 125.

In operation, the energizing of taillight 130 produces light energy within housing 132 which is directed outwardly through lens 131. Additionally, a portion of the light energy produced within taillight 130 is received by input end 117 and coupled by light pipe 116 to output end 118. The resulting light coupling causes the spherical portion of output end 118 to radiate light energy and produce a visible indication of the energizing of taillight 130.

What has been shown is a low cost, easy to install add-on light monitor system which provides direct and reliable indication to a vehicle operator of the operational condition of the vehicle signal and warning lights. The system shown utilizes a light pipe which may be added to vehicles which have been manufactured without the benefit of such light monitoring systems.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in combination with a vehicle having a body, a driver's seat and a signal light, an add-on light monitor comprising:

a light pipe having an input end, a filter supported thereon an output end and a light coupling body therebetween; and attachment means for securing said light pipe to said body such that said input end is optically coupled to said signal light and said output end is viewable from said driver's seat, said light pipe being installable upon said body following complete fabrication and assembly of said vehicle.

2. An add-on light monitor as set forth in claim 1 wherein said light pipe is formed of a rigid clear material.

3. An add-on light monitor as set forth in claim 2 wherein said light pipe is generally L-shaped.

4. An add-on light monitor as set forth in claim 2 wherein said output end is generally spherical.

5. An add-on light monitor as set forth in claim 4 wherein said coupling body defines a generally circular cross section.

6. An add-on light monitor as set forth in claim 3 wherein said coupling body defines a generally rectangular cross section.

7. An add-on light monitor as set forth in claim 1 wherein said attachment means includes an aperture formed in said signal light and a sealing gasket supported within said aperture and receiving said input end.

8. An add-on light monitor as set forth in claim 2 wherein said light coupling body defines a pair of coupling elements having a pair of isolated input ends and a pair of output ends coupled to said output end of said light coupling body.

9. For use in combination with a vehicle having a body, a driver's seat and a signal light, an add-on light monitor comprising:
   a light pipe formed of a rigid clear material and having an input end, an output end, a light coupling body therebetween and a filter supported upon said input end; and
   attachment means for securing said light pipe to said body such that said input end is optically coupled to said signal light and said output end is viewable from said driver's seat,
   said light pipe being installable upon said body following complete fabrication and assembly of said vehicle.

10. For use in combination with a vehicle having a body, a driver's seat and a signal light, an add-on light monitor comprising:
   a light pipe formed of a rigid clear material and having an input end, an output end and a light coupling body therebetween, said output end defining a generally spherical lens; and
   attachment means for securing said light pipe to said body such that said input end is optically coupled to said signal light and said output end is viewable from said driver's seat,
   said light pipe being installable upon said body following complete fabrication and assembly of said vehicle.

* * * * *